Patented May 27, 1930

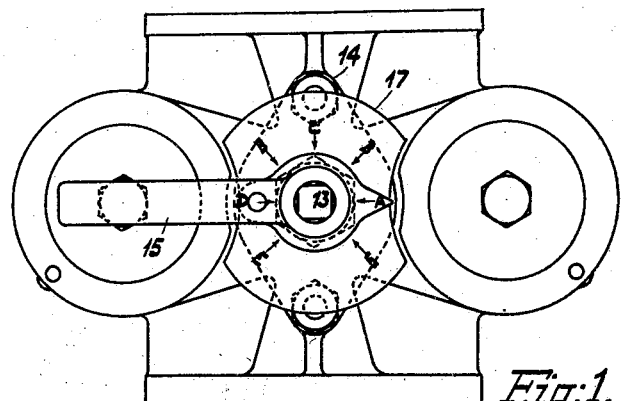
Fig:1.
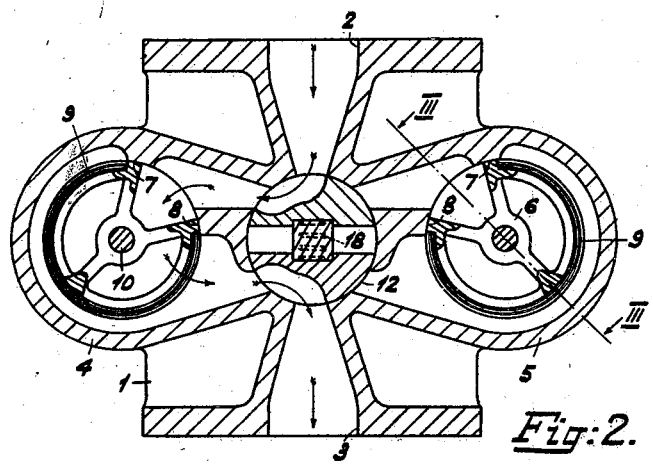
Fig:2.
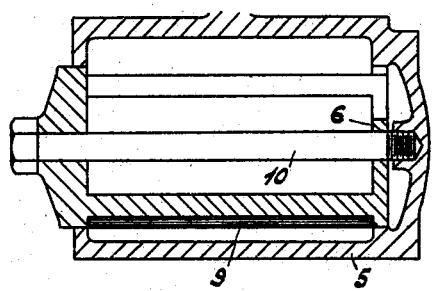
Fig:3.
INVENTOR.
Jean Zwicky.
by A. E. Odell
Attorney.

1,759,927

UNITED STATES PATENT OFFICE

JEAN ZWICKY, OF MAIDENHEAD, ENGLAND

FILTER

Application filed September 26, 1925. Serial No. 58,902.

This invention relates to filters or strainers comprising a one-piece filter body equipped with two straining members, and with control means for directing the fluid supplied to said body through one or other of said straining members, and cutting it off from the other, the straining members being removably secured in the body so that when one of them is thus cut off from the current of fluid it may be removed for cleaning or replacement without affecting the filtering operation. The invention provides for filtering fluid when desired through both filters or straining members in succession, or for eliminating the filters altogether and permitting unrestricted passage of the fluid.

A preferred embodiment of the invention makes use of two straining members which are of cylindrical form, each comprising a skeleton adapted to make joint with the filter body and a sheet or sheets of straining or filtering material stretched upon said skeleton. The filter body includes a valve seating located centrally between the two straining members and between the inlet and outlet of the body, and a rotary valve in said seating adapted to connect either straining member between the inlet and outlet and to cut off the other from the fluid path.

Such valve is also adapted to direct the fluid in succession through each of the straining members, or to permit it to pass directly from inlet to outlet without traversing either of the straining members.

For this purpose channels from the inlet and outlet of the body extend to diametrically opposite ports in the valve seating, and channels from the two sides of each straining member extend to neighbouring ports in the seating, all of said ports being evenly spaced around the seating; and the rotary valve is adapted to connect together two adjacent pairs of adjacent ports in the seating.

Furthermore the rotary valve is formed in two substantially semi-cylindrical parts, one of which is reversible end to end, so that the valve instead of connecting adjacent pairs of adjacent ports may connect opposite pairs of adjacent ports.

The invention is illustrated in the accompanying drawings,

Figure 1 being an end elevation of it,

Figure 2 a transverse section and

Figure 3 a longitudinal section on the line III—III of Figure 2.

The one-piece filter body 1 has an inlet 2 and outlet 3, adapted for connection to pipes, not shown, running in any desired relative directions; in the construction illustrated the inlet and outlet are opposite adapting the filter for insertion in a straight length of pipe. The filter body comprises a plurality of casings, as illustrated two, 4 and 5, for the accommodation of straining members. It is preferred to employ cylindrical straining members, and therefore the casings 4, 5 are substantially cylindrical. They are closed at one end, and open at the other for the insertion or removal of the straining member. Each straining member comprises a skeleton or framework 6 adapted to make joint with the casing along lines at 7 and 8 parallel to the cylinder axis and circumferentially at each end, and one or more layers of straining or filtering material, for example wire gauze 9 stretched upon said skeleton in the form of an incomplete cylinder. Fluid admitted between the lines 7, 8, to the interior of the straining member passes through the straining member to the annular space intervening between the straining member and the casing. The inlet and outlet of each casing may be located where desired, the casing being so shaped that fluid passes from its inlet to the opening between the generators 7, 8, while the annular space around the straining member is connected with its outlet. In the construction shown the inlet and outlet of each casing extend side by side along the length of the casing. The skeleton 6 is closed at its end by a cap, which, when the straining member is inserted in the casing closes the open end of the casing. The straining member is secured in position for example by a bolt 10 screwing into the closed end of the casing, and means, not shown, are provided to position it circumferentially and prevent it rotating.

In the middle of the filter body 1, between the inlet 2 and outlet 3 on the one hand, and between the filter casings 4 and 5 on the other hand is located a substantially cylindrical valve seating 11 having in it six evenly spaced ports connected by channels in the body respectively to the inlet and outlet of the body and the inlet and outlet of the two casings. Within this seating is a rotary valve 12, having a non-circular spindle 13 projecting through the end plate 14 which closes the end of the valve seating. Outside the body this spindle receives a handle 15 by which it may be turned, and which carries a pointer 16 moving over a marked plate 17.

The valve 12 is made in two semi-cylindrical parts, which may be forced apart and firmly pressed upon the valve seating by the pressure or suction of the fluid which the valve controls, or by springs 18 inserted between them. In each part of the valve is a port-connecting passage which is not symmetrical with respect to the mid-plane of the half cylinder.

The action of the apparatus is as follows. When the handle 15 is in the position shown in Figure 1 the valve 12 has the position shown in Figure 2 in which it connects the inlet 2 and outlet 3 of the filter body to the two sides of the left hand straining member. If the pointer 16 is shifted to either position B the inlet 2 is closed and the flow of liquid is interrupted. With the pointer in position C the valve permits the passage of fluid direct from the inlet 2 to the outlet 3 without passing through either straining member. When the pointer points to D the fluid is directed through the right hand filter member. In the position A the right hand casing is wholly cut off from the fluid path. Consequently by loosening the screw 10 the straining member may be removed and cleaned and the interior of the casing cleaned while filtering is proceeding through the left hand straining member. Conversely in position D the left hand straining member may be removed.

If one portion of the valve 12, say the upper portion, be removed and reversed endwise and replaced, and the pointer directed to E, fluid is admitted from the inlet 2 to the left hand straining member, and after passing that member is directed through the transverse channel of the valve 12 to the right hand straining member through which it passes to the outlet 3. This is useful where specially thorough filtering is required, when it may be convenient to employ a relatively coarse straining member in the left hand casing and a finer one in the right hand casing.

I claim:—

1. A filter comprising a filter body having an inlet and outlet and including casings for two straining members a valve seating and channels connecting said inlet and outlet and said casings to ports in said valve seating, and a rotary valve formed in two parts with a passage between them fitting said seating and having channels adapted to connect the inlet and outlet respectively to the two sides of the one straining member, or to the two sides of the other straining member, one portion of said valve being removable and reversible to enable the valve to connect the two casings in succession between the inlet and outlet.

2. In a filter the combination of a one piece filter body having an inlet and outlet and including casings for straining members and a valve seating, a pair of straining members therein, and a rotary valve located in said seating between said casings for directing fluid through one or other of said straining members in a given direction or through both in succession in the same direction.

3. In a filter the combination of a filter body comprising casings for two straining members and a substantially cylindrical valve seating and having an inlet and outlet and channels connecting said inlet and outlet and said casings to ports in said valve seating, removable straining members in each of said casings, and a rotary valve comprising two substantially semi-cylindrical members pressed apart to fit said seating, said members having port-connecting passages non-symmetrical about the mid-plane of the half-cylinders, one of said members being reversible end for end whereby the liquid may be passed through either one or the other of said straining members in one direction, or through both of said straining members in the same direction.

4. In a filter the combination of two straining members each comprising a skeleton and a sheet of straining material stretched thereon to form an incomplete cylinder, a filter body including casings with which said skeletons make joint and having a main inlet and outlet, and a valve in said body adapted to connect the interior and exterior of either straining cylinder to the main inlet and outlet respectively, or to connect the interior of one straining cylinder to the main inlet the exterior of the other to the main outlet and the exterior of the first to the interior of the second.

5. A dual filter comprising a casing having an inlet and outlet, two straining members therein, a valve seating therein having ports connected to the inlet and outlet and, to the two sides of each straining member, and a valve fitting said seating formed in two parts pressed apart by a spring, one of said parts being reversible end for end whereby the liquid may be passed through either one or the other of said straining members in one direction, or through both of said straining members in the same direction.

In testimony whereof I have signed my name to this specification.

JEAN ZWICKY.